June 22, 1926.

G. HOMIAK

VEHICLE WHEEL

Filed March 30, 1925

1,589,647

Inventor:
George Homiak,
attys.

Patented June 22, 1926.

1,589,647

UNITED STATES PATENT OFFICE.

GEORGE HOMIAK, OF NEWMARKET, NEW HAMPSHIRE.

VEHICLE WHEEL.

Application filed March 30, 1925. Serial No. 19,231.

This invention relates to a vehicle wheel including a demountable rim separably engaged with a pneumatic or other resilient tire. The invention is embodied in certain improvements in the construction of the rim and wheel, whereby the rim is conveniently and securely engaged with the tire and with the wheel, and simplicity of construction is obtained.

Of the accompanying drawings forming a part of this specification,—

Figure 1 is a side view of a wheel embodying the invention.

Figure 2 is a section on line 2—2 of Figure 1.

Figure 3 is a section on line 3—3 of Figure 1, on a larger scale.

Figure 4 is a fragmentary perspective view, showing a portion of the felly.

Figure 5 is a perspective view of one of the offset bolts hereinafter described.

Figure 6 is a fragmentary plan view, showing portions of the rim.

The same reference characters indicate the same parts in all of the figures.

The felly 12 of my improved wheel is provided at its inner edge with a stop flange 13, and in its periphery with a series of recesses 14, opening on the periphery and on the opposite edge of the felly and having closed ends adjacent to the stop flange, as shown by Figure 4. There are preferably four recesses and the same are uniformly spaced apart.

The rim is composed of two rings 15 and 16, separably abutted together at their inner edges, and each provided at its outer edge with a flange 17, formed to engage a tire shoe 17ª, as indicated by Figure 3. To the inner ring 15 are secured bolts 18, corresponding in number and arrangement with the recesses 14, and adapted to enter the recesses and project from the open ends thereof, as shown by Figure 3. The bolts are provided with offset shank portions 19, formed to bear on the inner surface of the ring 15, and secured thereto by rivets 20, inserted in holes 21, formed in the shank portions.

The bolts are offset from the ring, so that they are adapted to enter the recesses 14 and extend across the inner side of the ring 16.

On the outer ring 16 are formed inwardly projecting perforated ears 22, arranged to receive the bolts 18, and a series of intermediate perforated ears 23, arranged to receive a series of bolts 24, fixed to the felly between the recesses 14, and projecting from the edge of the felly on which the recesses open.

In assembling the parts of the wheel, the inner ring 15 is placed on the felly in contact with the stop flange 13. The outer ring 16 is then placed on the felly and abutted against the inner ring 15 as shown by Figure 6, the ears 22 receiving the offset bolts 18, and the ears 23 receiving the intermediate bolts 24. Nuts 25 are then engaged with the bolts 18 and tightened to clamp the rings together. Finally nuts 26 are engaged with the intermediate felly bolts 24 and tightened to confine the rim on the felly against the flange 13. The inner ring 15 preferably overlaps the outer ring 16, as shown by Figures 2, 3 and 6.

The inner edge of the ring 15 may be provided with a recess 27 (Figure 6) arranged to receive the valve 28 of a pneumatic tire. The inner edge of the ring 16 extends across the mouth of the recess to confine the valve therein.

It will be seen that the parts may be quickly and conveniently assembled and separated.

The recesses 14, receiving the offset bolts 19, permit the rings 15 and 16 to be seated directly on the periphery of the felly, as shown by Figure 3, so that the felly firmly supports the rings, there being no intermediate space between the rings and the felly. The recesses also guide the operator in placing the inner ring 15 on the felly.

I claim:

In a vehicle wheel, a rim composed of an inner and an outer ring, said rings being adapted to be separately abutted together on the periphery of a felly, each ring having a tire-engaging flange at its outer edge, offset bolts fixed to and offset inward from the inner ring, and adapted to project into recesses in the felly and laterally therefrom, the outer ring having a series of perforated ears, arranged to receive the offset bolts, and nuts engaged with the offset bolts and seated on the ears, to clamp the rings together.

In testimony whereof I have affixed my signature.

GEORGE HOMIAK.